United States Patent [19]

Lyon et al.

[11] 4,106,480

[45] Aug. 15, 1978

[54] REFLECTIVE SOLAR HEAT COLLECTOR

[75] Inventors: Floyd A. Lyon, Brookville; Henry Harrison, Locust Valley, both of N.Y.

[73] Assignee: Halm Instrument Co., Inc., Glen Head, N.Y.

[21] Appl. No.: 788,983

[22] Filed: Apr. 19, 1977

Related U.S. Application Data

[63] Continuation of Ser. No. 640,694, Dec. 15, 1975, abandoned.

[51] Int. Cl.² .................................................. F24T 3/02
[52] U.S. Cl. ....................................... 126/270; 126/271
[58] Field of Search ................................. 126/270, 271

[56] References Cited

U.S. PATENT DOCUMENTS

| 73,355 | 1/1868 | Marshall | 126/270 |
|---|---|---|---|
| 1,951,404 | 3/1934 | Goddard | 126/270 |
| 2,969,788 | 1/1961 | Newton | 126/271 |
| 3,847,136 | 11/1974 | Salvail | 126/270 |
| 3,964,464 | 6/1976 | Hockman | 126/270 |

Primary Examiner—William F. O'Dea
Assistant Examiner—Larry Jones
Attorney, Agent, or Firm—James P. Malone

[57] ABSTRACT

A reflecting solar heat collector. A stationary cylindrical receiver surface absorbs sunlight. An array of reflecting mirror strips are rotatably mounted in substantially parabolic arrangement having the receiver surface substantially at its focus. Motor means are connected for pivotally rotating said mirror strips substantially in unison about spaced-apart axes parallel to said receiver surface and substantially in said parabolic arrangement, to track the sun's apparent motion.

5 Claims, 7 Drawing Figures

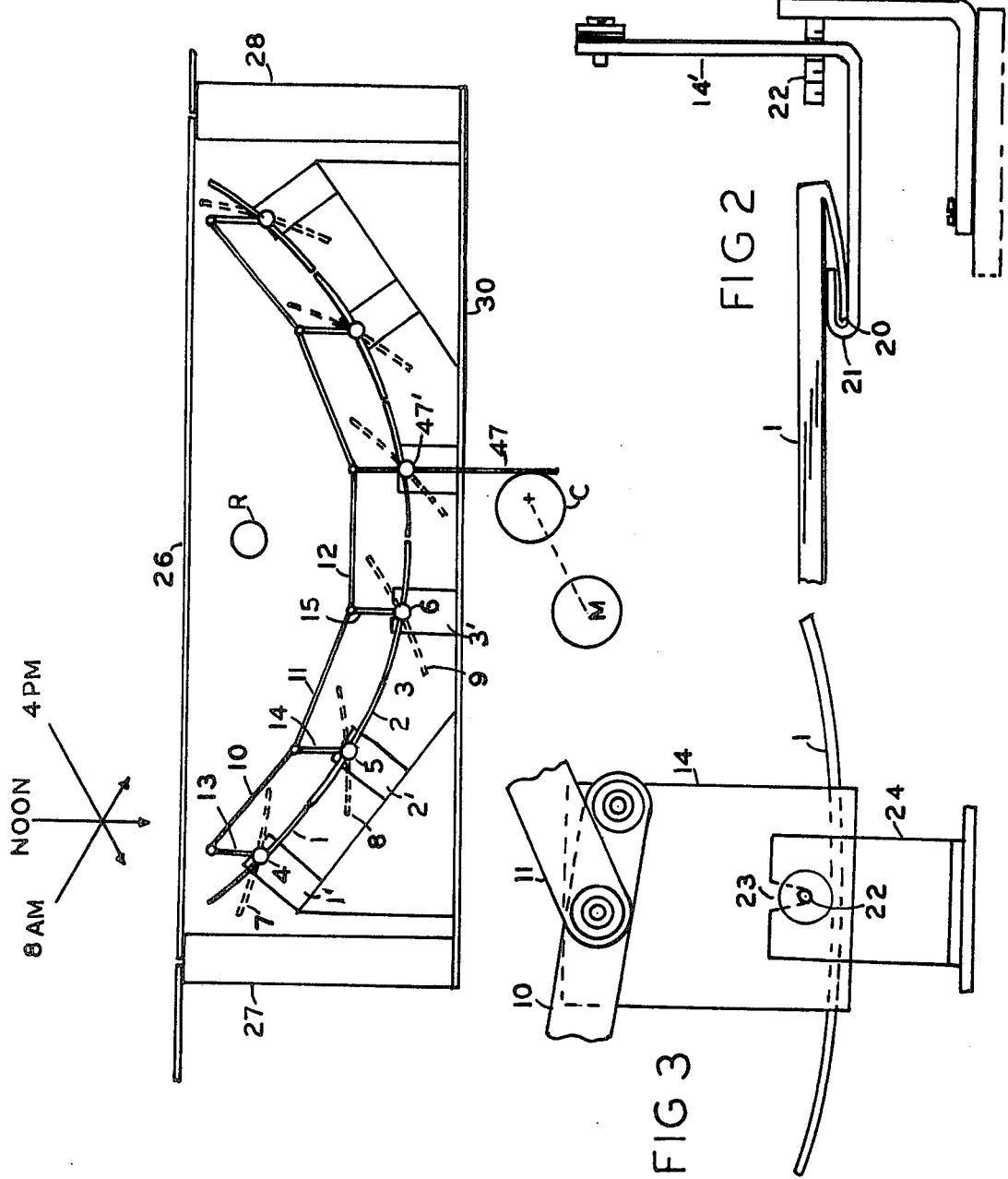

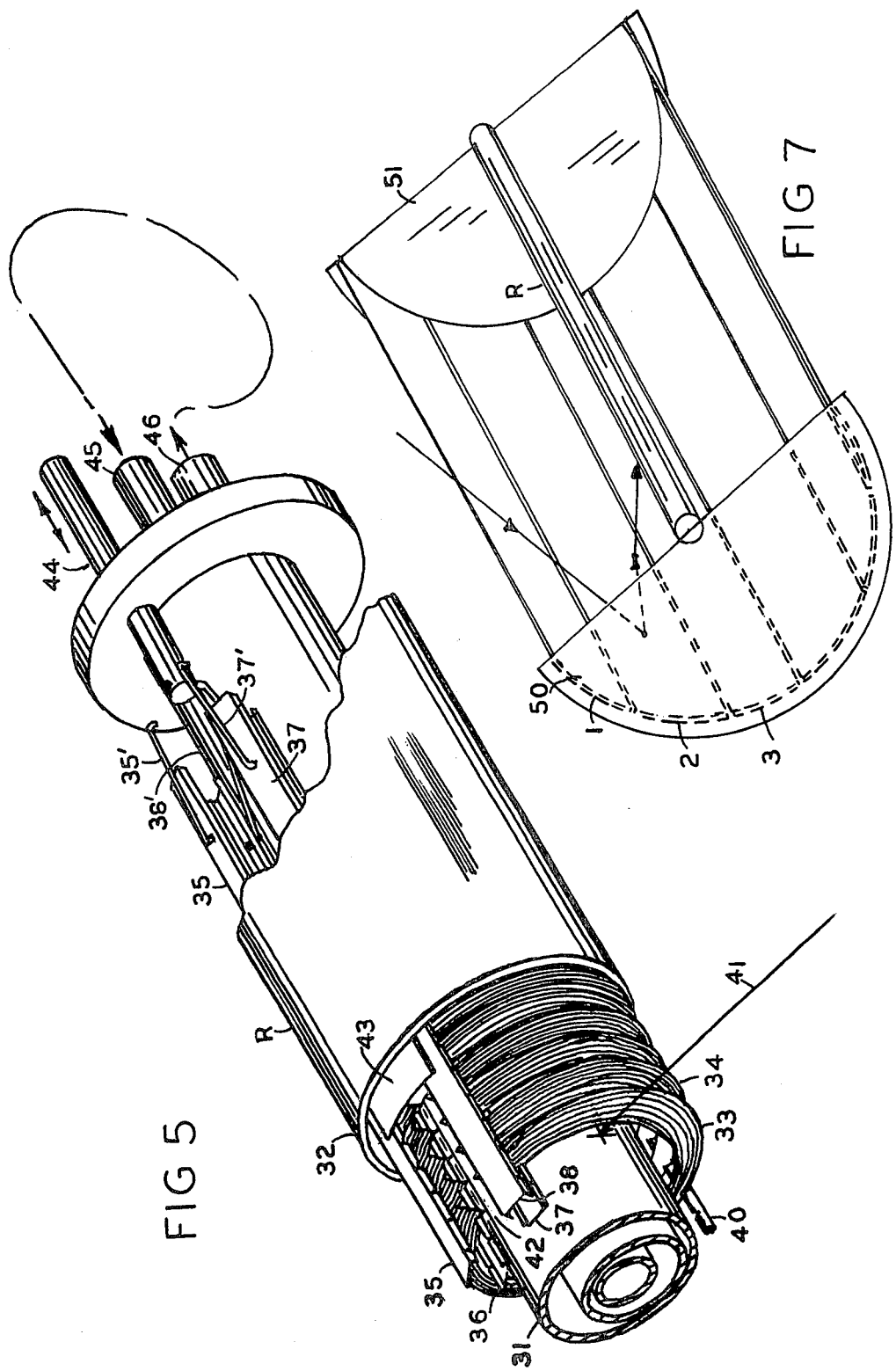

REFLECTIVE SOLAR HEAT COLLECTOR

This is a continuation, of application Ser. No. 640694, filed 12/15/75 now abandoned.

This invention relates to solar heat collectors.

There are two important characteristics of heat collected from sunlight. One is quantity and the other is quality. The quantity of heat which can be collected is proportional to the area of the collector, with the transmission of light to the receiver, and with the fraction of light reaching the receiver which is absorbed. The quality of heat collected depends on the temperature at which it is delivered for utilization. Since heat losses, which reduce the amount of useful heat collected, rise with collector temperature, it is important to make heat losses low when both quality and quantity of heat are required.

High quality of heat is important for heating domestic hot water, and for powering heat engines, mechanical devices, air conditioning apparatus, and electric generators, as well as many industrial processes.

As is well known, reflective solar heat collectors serve to concentrate the rays of the sun falling on a large area on a relatively small receiving surface. The relatively small receiver has correspondingly less heat loss because of its small area, and also can economically be treated with loss-preventing devices such as a selective low-emission surface, an evacuated transparent envelope, and radiation-suppressing vanes as described in a copending application, Ser. No. 599,379, filed July 28, 1975, for "VANES FOR SOLAR HEATING".

Since the apparent direction of the sun is constantly changing from hour to hour and from season to season, any concentrating reflective solar heat collector must have moving elements to keep the sun's image falling on the receiving surface is high quality heat is to be collected for a substantial amount of time. For example mounts for parabolic cylindrical reflecting focussing collectors are known, which turn about one or two axes so as always to face the sun directly.

When so mounted, such collectors do deliver high quality heat. However, the area of a practical collector must be large to collect enough heat, for example, to air condition or heat a typical one-family house, so large that the mount for turning it in one piece would be impractical, and to supply a sufficient number of smaller mounts of the same type would be costly.

The quality of heat collected by a reflective collector of given aperture area depends on the reflectivity of the mirror surface, which may be diminished as much as 25% by aging and weathering. Also, the amount of heat collected will be reduced by any gaps in the mirror surface or shadowing of the mirror.

Accordingly, it is the primary object of this invention to provide a solar heat collector which delivers a large amount of high quality heat collected from a limited area.

Another object is to provide a reflective solar heat collector which efficiently concentrates sunlight from a large aperture area onto a small receiver where it is absorbed to produce heat. Because the receiver is small, it can deliver high quality heat with relatively low losses.

Another object is to provide a reflective solar heat collector which constantly collects sunlight from a large area but does not require a very large mirror mounted to tilt about one or two axes. This is accomplished by subdividing the collector into a number of smaller collectors which together substantially cover a large area, but have a low profile not subject to excessive wind pressures, and not aesthetically disturbing.

Another object is to provide a reflective solar heat collector which requires relatively little space for movement in tracking the sun, so that it can be housed, for example, between the roof joists of a house. This is accomplished by subdividing the mirror of each small collector into smaller strips, each rotatable about its own separate axis.

Another object is to provide a reflective solar heat collector, subdivided into smaller collectors having mirrors subdivided into rotatable strips, which collects sunlight from the entire fixed aperture area with a minimum of gaps and shadowing. This is accomplished by forming these rotatable strips as portions of a parabolic reflecting surface having the receiver surface at its focus and positioning their separate axes of rotation substantially in that parabolic surface.

Another object is to provide a reflective solar heat collector which has a mirror protected against weathering and having an easily renewable surface.

An important object is to achieve the foregoing objects, and others which will be apparent from the detailed desescriptions, at a cost which is practical for residential heating and cooling.

These and other objects of the invention will be apparent from the following specification and drawings of which:

FIG. 1 is a section view showing the configuration of a reflective solar heat collector mounted between the beams of a roof.

FIG. 2 is a partial section of the terminal arrangement for supporting the mirror sections.

FIG. 3 is an end view of the terminal arrangement shown in FIG. 2.

FIG. 5 shows a partial cutaway perspective view of a receiver suitable for use in the collector of FIGS. 1 and 4.

FIG. 7 is a perspective view of an embodiment of the invention.

FIG. 8 is a view of the grooved reflecting discs and receiver.

Figure 4:
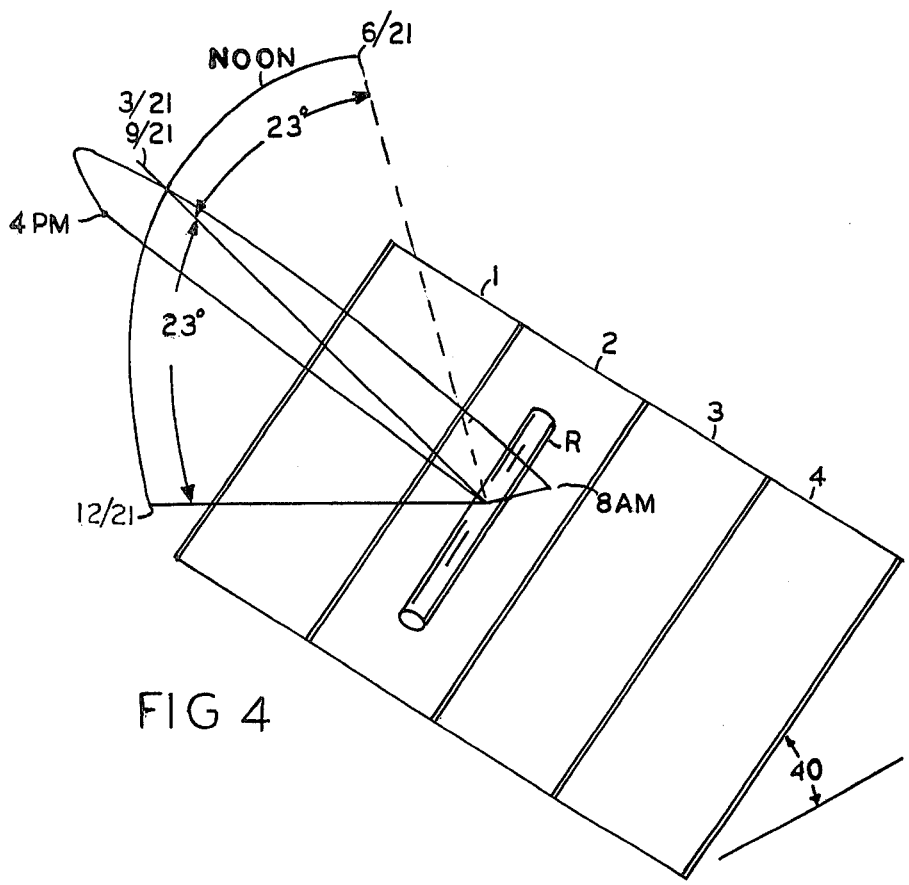
FIG. 4 shows a preferred orientation of the collector of FIG. 1.

In FIG. 1, the collector comprises a cylindrical parabolic mirror means and a receiver R at the focus of the parabola, the mirror is subdivided into separate strips 1, 2, 3, etc. These strips are mounted on blocks 1', 2', 3', etc., and are rotatable separately about axes 4, 5, 6, etc. When so rotated they may simultaneously assume the deflected positions 7, 8, 9, etc. Means are provided to turn each mirror strip so that the rays of sunlight falling on it are reflected to an approximate focus on the receiver surface.

When the sun is on a line directly above the collector each mirror lid substantially at the parabolic cylindrical surface, but when the sun moves off line by an angle A, the mirrors must all turn an angle A/2 to keep the rays falling on the receiver. To make all mirror strips turn through the same deflection angle, they are coupled by links 10, 11, 12, etc., and arms 13, 14, 15, etc. Together with pivots at axes 4, 5, 6, etc., these links and arms form parallelogram linkages, driven by motor M, which constrain all the mirror strips to turn through equal deflection angles, by means of cam C.

As shown in FIG. 3, the mirrors may be adjusted in angular position by adjustment holes in arm 14 for seasonal variation of the sun's angle.

The motor M is connected to cam C which operates arm 47 which is pivoted at 47' and connected to the center link 12. Other equivalent drive connections may be used.

For reasons of economy it is desirable to make the mirror strips wider than the receiver tube so there will be less parts required. When they are deflected from true parabolic orientation, the focus of rays reflected toward the receiver tube is subject to aberrations which cause spreading, and will cause more spreading on one side of the receiver than the other. If the receiver were to be enlarged to absorb all of the rays, the heat losses from the receiver would be correspondingly greater. Thus, it is desirable to balance the various disposable factors judiciously to maximize the cost effectiveness of the collector. When this is done, the optimum angular deflections are found to be substantially, but not exactly, equal and the optimum mirror strip shape is substantially, but not exactly, parabolic.

There are other cylindrical arrays of mirrors which will bring the rays of the sun to a focus on a receiver tube. For example, we have studied the possibilities of substantially flat mirrors in a plane. When viewed from the direction of the sun however, there are gaps between these mirrors and areas where one mirror shadows another, so that some of the sunlight falling on the area of the array fails to reach the receiver. A further disadvantage of the plane mirror array when used in a configuration like FIG. 1, is that much of the day's sunlight is intercepted and shadowed by the walls of the chamber housing the collector, such as roof joists. Therefore, the parabolic array of FIG. 1 is preferred.

Turning now to FIGS. 2 and 3, the mirror strip 1, is shown as a strip of reflective film which may be aluminized plastic such as "mylar". The end of the strip is wrapped around a curved metal anchor strip 20, detachably secured in a clip 21. The clip can rotate, pivoting about a hardened screw 22, with which it is threadedly engaged. To an arm portion 14' of clip 21 at least one link 11 is pivotally secured. The head of pivot screw 22 is removably engaged in a notch 23 of bracket 24.

The assembly just described, cooperating with a similar assembly at the opposite end of the mirror strip, serves to tension the mirror strip. Under tension, the mirror strip takes the contour shape impressed by the curved anchor strip 21. It also serves to orient the mirror strip around pivot screw 22, in a direction dictated by links 10, 11.

Figure 6:
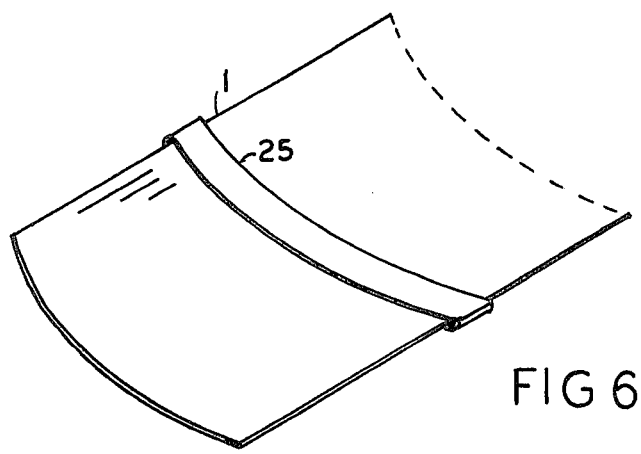
FIG. 6 illustrates a barrette type clip for maintaining the contour of a mirror strip.

Barrette clips 25 of wire may be slipped over the taut reflecting strip to assist in controlling its curvature, as shown in FIG. 6.

When it is necessary to replace the mirror strip due to weathering or other deterioration, it is clearly easy to loosen pivot screw 22, detach anchor strip 21 from the clip, replace the mirror strip 1, wrap the new strip end around the anchor strip, replace it on the clip, and retighten the pivot screw.

In FIG. 1, a plurality of these strips and strip mounting assemblies cooperate to form the mirror surface which directs sunlight to the receiver surface. The various parts of the collector are protected from the weather by a fixed transparent cover 26, secured to the joists 27 and 28, etc. Although this transparent cover may be of glass-reinforced fiberglass which has a glare-preventing random irregular reflecting surface, this material commonly disperses light by a relatively large angle, which may be ±4°. A correspondingly larger receiver surface, with larger heat losses, would then be required to intercept most of the collected light. The preferred cover material is plane glass or irregular-surfaced glass with parallel surfaces, which has uniform index of refraction and correspondingly low angular dispersion. For access when the mirror surface must be replaced, the mirror strips and their mountings are assembled as a unit on a panel 30, which may be insulated and may be hinged to the joists. Thus, the rain-resistant transparent cover need never be disturbed. The receiver R with its plumbing connections, independently mounted to the joists, can also remain untouched.

Losses at the receiver-surface are: reflection of incident light, radiation of infra-red at the receiver temperature, losses by convective currents of heated air, and losses by conduction. FIG. 5 shows means for reducing these various kinds of loss.

Free convection loss is reduced by enclosing the hot receiver tube 31 in an evacuated glass envelope 32. Since convection is approximately proportional to the square of the gas density, a moderate reduction in air pressure within the envelope, say to 1/10 of an atmosphere, cuts free convection losses to 1%.

Direct forced convection losses from the receiver are eliminated by covering the collector with the transparent window 26 which excludes wind.

To reduce conduction losses within the envelope 32, a gas such as Freon 12 or carbon tetrachloride, having a relatively high molecular weight, may be substituted for air. This reduces the gas heat conduction loss by a factor of three or more.

Further evacuation of the envelope is not very effective in reducing heat conduction until a pressure of $10^{-7}$ atmospheres is reached, when the mean free path of the molecules becomes comparable with the spacing of the receiver from the envelope wall.

Various selective black coatings are known which can be used on the receiver tube 31 to improve the absorption of sunlight and reduce the radiation of infra-red at receiver temperatures. Some examples are copper oxide, zinc chromate, zinc chloride, black chrome, and black nickel. These coatings may improve the ratio of absorption to radiation by as much as a factor of six. However, the maximum absorption of sunlight which can be attained with selective surfaces is less than the absorption of good flat black surfaces. Furthermore, the reflectance of selective surfaces tends to be fairly large when the angle of incidence of sunlight is far from perpendicular.

The radiation-supressing grooved reflector vanes 33, 34, etc., as taught by the previously mentioned copending application, may be used to trap sunlight which would otherwise be reflected by the receiver surface and to hold back infra-red radiation. The vanes are substantially parallel to the incoming rays of sunlight, but the reflected or radiated rays from the receiver are randomly distributed in direction. Thus, much of the reflected and radiated flux from the receiver falls on the grooved reflecting surfaces of the vanes and is thrown back against the receiver surface. The vanes are preferably made of mirror-finished aluminum, which increases the absorption of sunlight by up to 20% and reduces the radiation of infrared by a factor of five.

As shown in FIG. 5, the ring-shaped radiation-suppressing vanes 33, 34, etc., are supported on the outside by the glass envelope 32, and are spaced and positioned by the notched channels 35, 36, 37 and 38, and by the notched strip 40. The rings are substantially concentric with the receiver tube 31, but are separated from it by a space of about ¼ of its radius, for thermal isolation and for a geometric reason which will be explained.

The preferred position of the collector, shown in FIG. 4, is on a south-facing slope, (in the northern hemisphere) tilted to an angle with the horizontal equal to the geographical latitude. Thus, the axis of the receiver tube and the mirror array is parallel to the axis of rotation of the earth. Around this axis the apparent motion of the sun is 15° per hour, so the corresponding motion of the mirror strips 1, 2, etc., will be 7-½° per hour. On March 21, and September 21, the rays of the sun are perpendicular to the axis, but on other days the angle with the axis departs from 90°, by up to ±23° at the summer and winter solstices. On any particular date, all the rays striking the receiver surface, even the off-axis rays, are incident at the same angle with the axis.

If the collector is not parallel to the polar axis of the earth, the required rotation rate of the mirror strips varies throughout the day, and the angle of the rays striking the receiver varies through the day. Also, the total amount of sunlight entering the collector area during a whole year is less if the collector is not parallel to the polar axis and directly south-facing. However, the departure from uniform motion and from maximum total collection is very small for small departures from the preferred orientation.

In FIG. 5, the rings 33, 34, may be forced to take a conical shape on dates when the converging incident rays are not perpendicular to the axis of the receiver and thus they can be kept substantially parallel to the rays coming in to the receiver. This is done by manipulating the supporting notched channels and strip. For example, if the outer channels 35 and 38, and the strip 40 are held in fixed axial position while the inner channels 36 and 37 are moved forward axially, each ring will be deformed into a conical surface convex forward. This sense of deformation would make the rings substantially parallel to rays arriving at an angle from the back, such as ray 41, thus allowing such rays to pass freely between the rings to the receiver surface.

The rings are notched as at 42, on their upper side, to allow them to deform easily into a conical shape. The upper side has no concentrated incoming radiation, and so the escape of radiation in that direction can be prevented by a fixed opaque reflector 43. When the notch closes in conical deformation, the positioning channels 36 and 37 which are axially fixed, and also the positioning channels 35 and 38, move closer together. Accordingly, these channels may be engaged in hinged relationship to the rings by notches. The outer channels 35 and 38 are secured to the end of the envelope by floating links 35', while the internal channels are controlled from the outside of the envelope by sliding a sealed actuator 44 working through links 36' and 37'.

Although rays incident at the receiver tube are substantially parallel to the coned radiation-suppressing vanes, the off-axis rays are not exactly parallel. The proportion of the incident radiation that is shadowed by the vanes depends upon the spacing of the vanes, which also determines the effectiveness of the vanes in suppressing reflection and radiation from the receiver surface. Also, this shadowing is less when the ring is farther 23° from perpendicular to the receiver, when 87% of the outgoing radiation is prevented from escaping, and when the receiver diameter is 75% of the average diameter of the rings, less than 6% of the receiver surface is shadowed by the vanes. Additional shadowing of the reflector by the ring structure is dependent on the width of the rings, and may, for example, be no more than 5% of the total incident radiation. The trapping of radiation reflected from off-axis rays striking the receiver more than compensates for these shadowing losses.

FIG. 7 shows the array of mirrors 1 through 3, etc., mounted between two fixed end mirrors, 50 and 51. As shown, the end mirror 50 will capture low angle winter sun rays which might escape the mirror system and cause them to be reflected back into the curved mirrors and then to the receiver R.

The heat collected in a reflecting solar heat collector which concentrates sunlight is concentrated in a relatively small receiver surface. This heat is transferred to a heat transfer liquid flowing inside the receiver. In view of the differential thermal expansion between the envelope and the receiver tube, it is convenient to bring the heat transfer liquid in and out at the same end of the receiver envelope. In the receiver shown in FIG. 5, the incoming heat transfer liquid flows through a tube 45, in the middle, while the return fluid flows through a tube 46 in the opposite direction in the remaining portions of the receiver tube cross-section. Heat flows from the receiver absorbing surface through the receiver tube into the outgoing heat transfer liquid. Heat transfer to the liquid is augmented at a particular receiver temperature by about 15% by an eccentric heat-conducting metal tube soldered to the inside of the receiver tube. Without such an extended internal heat transfer surface the receiver surface would be hotter, and thermal losses would be correspondingly higher for a given quality or temperature of heat delivered in the heat transfer liquid.

Thus we have described a practical reflecting solar heat collector which can deliver exceptionally high quality heat in practical quantities.

We claim:

1. A reflecting solar heat collector having a stationary receiver adapted to absorb sunlight, an array of parallel curved reflecting mirror strips under tension rotatably mounted having said receiver substantially at the focus of said mirrors, means for pivotally rotating said mirror strips substantially in unison about spaced-apart axes parallel to said receiver to track the sun's motion, each of said mirror strips being a strip of flexible reflective film stretched between two end termination pivoting means, the said two end termination pivoting means being shaped to generate the curved cross-section contour of said reflecting mirror strip and adapted to rotate for tracking the sun about their common pivot axis which is parallel to the straight cylindrical shape of the mirror strip, said strip being detachably secured at each end to said end termination pivoting means.

2. A reflecting solar heat collector according to claim 1, in which the curved cross-section contour of said reflecting mirror strip is further defined by barette clip means secured to said mirror strip.

3. A reflecting solar heat collector according to claim 1 in which said reflecting mirror strip is aluminized plastic.

4. A reflecting solar heat collector comprising a stationary cylindrical receiver surface adapted to absorb sunlight, an array of parallel curved reflecting mirror strips rotatably mounted having the said receiver surface substantially at the focus of said mirrors, means for pivotally rotating said mirror strips substantially in unison about spaced-apart axes parallel to said receiver surface to track the sun's motion and means for transferring heat from said cylindrical receiver surface for delivery to heat utilization apparatus, the mirrors being placed in a substantially parabolic arrangement with said receiver at its focus, means for reducing the heat loss from said cylindrical surface,
   said means for reducing heat loss including an evacuated transparent envelope surrounding said receiver surface in spaced apart substantially concentric relation,
   said receiver surface being surrounded by a plurality of axially spaced-apart radiation-suppressing groved reflecting discs of equal diameter concentric with said receiver surface, substantially parallel to rays of sunlight incident on said receiver surface, said discs adapted to reflect back substantially all the radiation from the said receiver surface which strikes their grooved reflecting surfaces.

5. A reflecting heat collector according to claim 4, including means for adjustably deforming said discs into conical form to render them substantially parallel to rays of incident sunlight which are not perpendicular to said receiver surface.

* * * * *